Oct. 8, 1935.                M. J. ANDERSON                   2,016,700
                           LIVE ROLLER CONVEYER
                          Filed Sept. 12, 1932          3 Sheets-Sheet 1

INVENTOR
MARTIN J. ANDERSON
By Paul, Paul & Moore
ATTORNEYS

Oct. 8, 1935.  M. J. ANDERSON  2,016,700
LIVE ROLLER CONVEYER
Filed Sept. 12, 1932  3 Sheets-Sheet 2
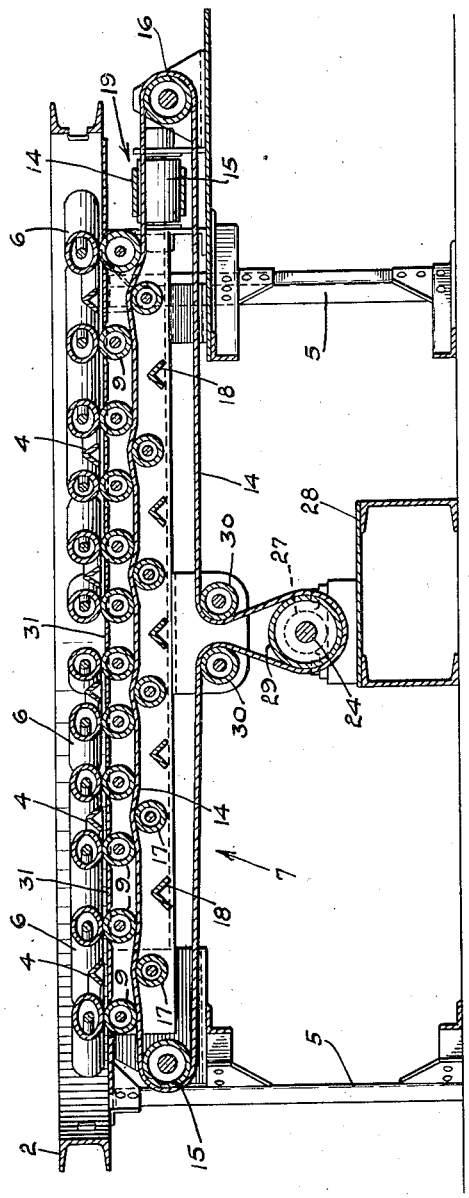
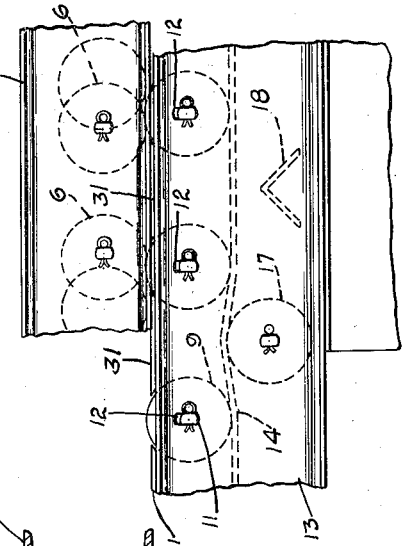
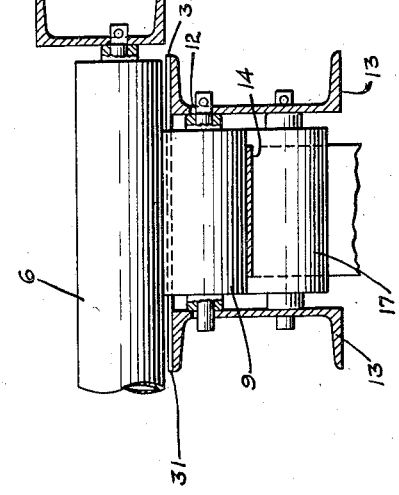
INVENTOR
MARTIN J. ANDERSON
By Paul, Paul & Moore
ATTORNEYS Oct. 8, 1935.  M. J. ANDERSON  2,016,700
LIVE ROLLER CONVEYER
Filed Sept. 12, 1932   3 Sheets-Sheet 3

INVENTOR
MARTIN J. ANDERSON
BY Paul, Paul & Moore
ATTORNEYS

Patented Oct. 8, 1935

2,016,700

UNITED STATES PATENT OFFICE 2,016,700

LIVE ROLLER CONVEYER

Martin J. Anderson, Ellwood City, Pa., assignor to Mathews Conveyer Company, Ellwood City, Pa., a corporation of Pennsylvania Application September 12, 1932, Serial No. 632,764

17 Claims. (Cl. 198—127)

It frequently becomes necessary to install conveyer systems in buildings and other places where the force of gravity cannot be utilized as a means for transporting the commodities over the system, because of the necessity of having to set the conveyer on a level or on a slight upward grade. In such systems, the load-carrying rollers of the conveyer are usually power driven, and it is an object of this invention to provide a live roller conveyer particularly adapted for such installations, comprising a bed which may be either straight or curved, or which may consist of both straight and curved sections, and said conveyer comprising a novel drive for rotating the load-carrying rollers thereof whereby packages or articles delivered thereto may be transported from one place to another over the system without being dependent upon gravity. The novel drive herein disclosed readily lends itself for use to drive the load-carrying rollers of a 180 degree live roller conveyer section, whereby such a section may be utilized for transporting commodities from one straight conveyer to another straight conveyer running in the opposite direction and arranged substantially parallel thereto. It may also be used for driving the rollers of conveyer curves of various other angles.

Various methods have been used for rotating the rollers of live roller type conveyers, and particularly the curved types adapted to transport articles in an arcuate path from one point to another. Among the various methods used for rotating the rollers of such conveyers, and one which is commonly used, is that of snubbing a rotating endless belt into frictional engagement with the lower portions of the peripheral surfaces of the load-carrying rollers. This necessarily means that the belt must be guided around the curve in a substantially arcuate path. Some inventors have used a very narrow, round or V-type belt. Such types are well adapted to be guided around a curved path, but the small area of the belt which frictionally contacts with the driven rollers, is not sufficient to rotate the rollers for carrying heavy loads. Others have used a relatively wide belt and have devised means for taking up the surplus along the inside edge of the belt occasioned by the belt being guided in a curved direction. To take up the surplus in such a belt, and at the same time keep the belt properly tracked, necessitates that a twisting action be imparted to the belt to thus take up the slack in the inner edge thereof. This may be accomplished by the use of suitable snubbing rollers arranged at an incline transversely to the line of travel of the belt, which requires close adjustment of said snubbing rollers, and concurrently places the belt under unnatural strains.

A further object of this invention is to provide an improved means for rotating the rollers of straight and curved live roller conveyers in a manner which is relatively simple and inexpensive, and which forms a more positive drive for conveying relatively heavy articles, and yet does not produce unnatural strains in the belt which tend to shorten the life of the latter, and which will not require close adjustment of the snubbing rollers, A further object is to provide a novel drive for a live roller conveyer curve, comprising short sections each including an endless belt, and the upper runs of said belts being snubbed into frictional engagement with a plurality of intermediate drive rollers which, in turn, frictionally engage the peripheries of the radially disposed load-carrying rollers of the curved conveyer to drive said rollers.

A further object is to provide a live roller conveyer curve having a driving means consisting of one or more drive sections disposed underneath the load-carrying rollers of the conveyer, and the number of drive sections required depending upon the length of the curve as, for example, one section for a 90 degree curve and two or more sections for a 180 degree curve.

A further object is to provide a conveying apparatus including a roller carrying bed comprising a plurality of gravity type, load-carrying rollers, which are adapted to be rotated by a series of drive rollers disposed in frictional driving engagement with the lower portions thereof, and said drive rollers being comparatively short and each peripherally engaging a run of a power driven belt, which belt is snubbed into frictional engagement with the peripheries of said drive rollers by a plurality of snubbing rollers.

A further object of the invention is to provide a power drive for a live roller curve wherein the drive comprises a plurality of relatively short, straight sections disposed underneath the load-carrying rollers of the curve, and on cords intersecting an arc of the curve, and each drive section comprising a plurality of drive rollers, a belt for driving said rollers, and a series of idler or snub rollers for snubbing the belt into frictional driving engagement with the lower portions of said drive rollers, whereby the upper portions of said drive rollers will frictionally engage the lower portions of the load-carrying rollers of the conveyer to drive said rollers, and the axes of the drive and snubbing rollers of each drive section being disposed in parallel relation and at substantially right angles to the longitudinal center line of the belt thereof, to prevent undue twisting of said belt, and the peripheries of said drive rollers directly engaging the peripheries of the load-carrying rollers of the conveyer in substantially a vertical plane whereby the driving connection between said drive and load-carrying rollers is maintained regardless of the angular relationship between said rollers, and all of said drive sections being operatively connected together for simultaneous operation.

The particular object of the invention therefore is to provide a power drive for the load-carrying rollers of a conveyer.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 2 is a vertical sectional view on the line 2—2 of Figure 1, showing the relative positions of the rollers of each drive section with respect to the load-carrying rollers of the conveyer;

Figure 3 is an enlarged detail sectional view on the line 3—3 of Figure 1;

Figure 4 is an enlarged detail sectional view on the line 4—4 of Figure 1;

Figure 1:
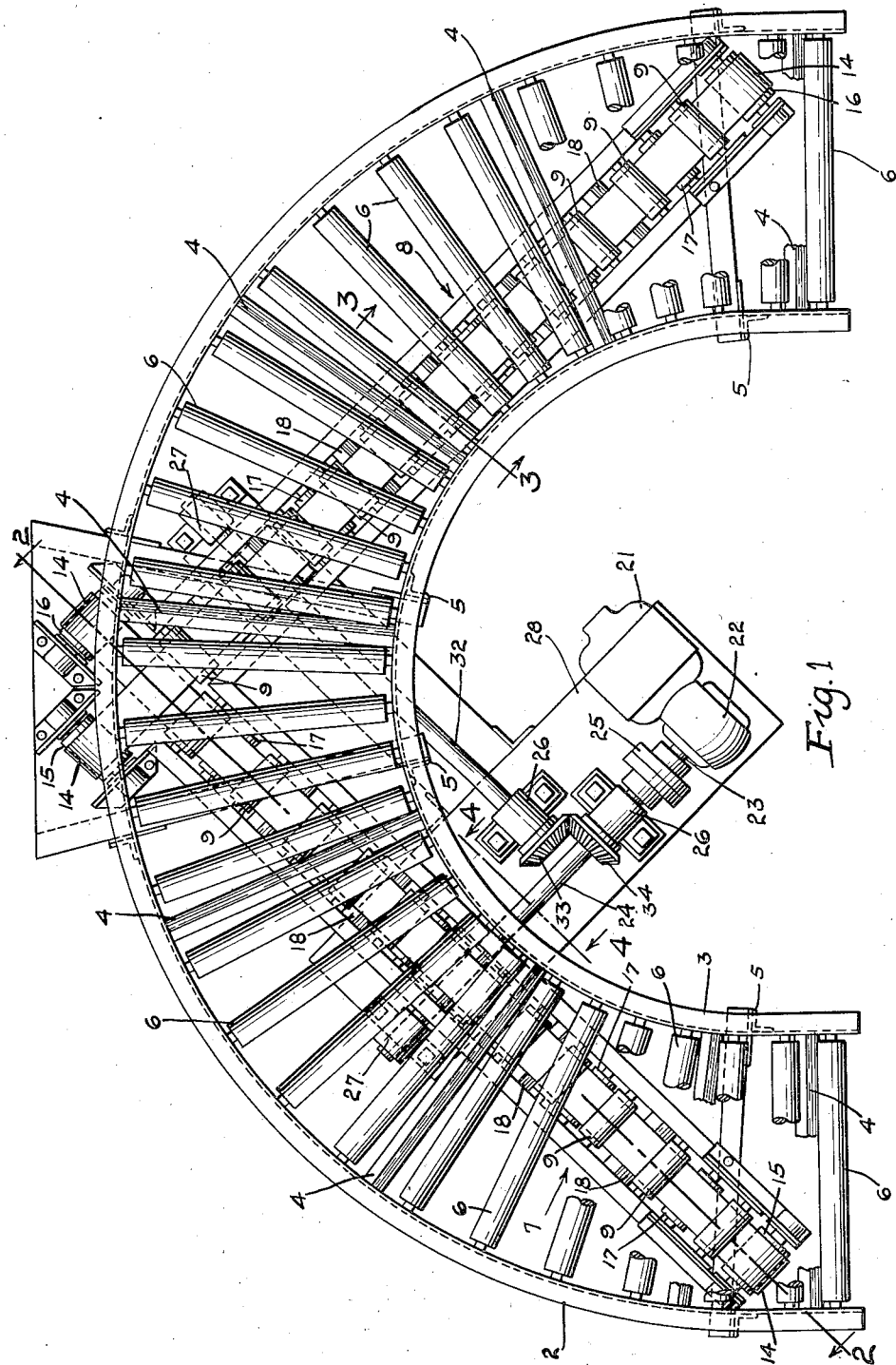
Figure 1 is a plan view showing the invention applied to a 180 degree curve.

In the selected embodiment of the invention here shown, for purposes of disclosure, there is illustrated in Figure 1, a live roller conveyer curve comprising spaced side rails 2 and 3 shown secured together in spaced relation by suitable cross members 4 interposed between said side rails and having their terminals secured thereto by such means as welding. The side rails 2 and 3 may be supported upon a suitable structural frame 5, as shown in Figure 2. A plurality of load-carrying rollers 6 are supported between the rails 2 and 3 by suitable bearings secured thereto, and are radially disposed as shown in Figure 1.

A feature of this invention resides in the novel means provided for driving the load-carrying rollers 6, whereby these rollers may be driven so as to positively convey commodities over the curve.

The drive for said load-carrying rollers is shown comprising a plurality of drive sections 7 and 8 which are substantially alike in construction, and it will therefore be necessary to describe but one in detail. As shown in Figure 2, each drive section comprises a plurality of drive rollers 9 having their axles 11 supported in suitable apertures 12 provided in side frame members 13, as best shown in Figure 4. The apertures 12 are preferably elongated vertically to permit a slight up-and-down movement of the rollers. A drive roller 9 is shown positioned beneath each load-carrying roller 6 and is held in peripheral driving engagement therewith by the upper run of a belt 14 supported upon suitable pulleys 15 and 16 carried by the frame of the drive section. A plurality of idler or snub rollers 17 are mounted between the side frame members 13 of the drive section, and are adapted to hold the upper run of the belt 14 in frictional driving engagement with the lower portions of the peripheries of the drive rollers 9, whereby when the belt is rotated, said drive rollers will be rotated to drive the load-carrying rollers 6 peripherally engaged therewith. The side frame members 13 of the drive section are shown spaced apart by suitable spacers 18, best shown in Figure 2.

In the form shown in Figure 1, the belts 14 of te drive sections 7 and 8 are arranged in intersecting relation at the center of the curve, as clearly shown in the upper portion of Figure 1, and the adjacent ends of the belts of the two drive sections 7 and 8 are arranged at different elevations so that the belts will clear one another, as clearly indicated at 19 in Figure 2.

The drive belts 14 of the drive sections 7 and 8 are driven from a suitable motor 21 shown operatively connected to a speed reducer 22 having its shaft 23 coupled to one end of a drive shaft 24 by a suitable coupling 25. The drive shaft 24 is shown supported in suitable bearings 26 and 27 which may be supported upon a suitable structure 28, as shown in Figures 1 and 2. A pulley 29 is secured to the shaft 24 in alinement with the belt 14 and has a driving connection with said belt, as shown in Figure 2. Suitable idler pulleys 30 are provided to guide the lower run of the belt downwardly into engagement with the drive pulley 29 secured to the shaft 24.

The belt 14 of the drive section 8 is driven from a shaft 32 mounted in similar bearings 26 and 27 and operatively connected to the drive shaft 24 by suitable beveled gears 33 and 34. Suitable means, not shown, may be provided for adjusting the tension in the drive belts 14 of the two drive sections.

Conveyers of the type herein disclosed are often used for handling hot sheet metal plates, and to prevent the heat radiating from such plates from damaging the drive belts 14, a series of plates 31 may be secured to the upper portions of the rails 13 between the drive rollers 9, as shown in Figures 2 and 3. These plates 31 may have their opposite edges beveled, as best shown in Figure 2, and substantially close the gaps or spaces provided between the drive rollers 9. The plates 31 have been omitted from Figure 1 so as not to obscure the parts arranged directly therebeneath.

An important feature of this invention resides in the arrangement of the drive rollers 9 with respect to the load-carrying rollers 6, whereby said drive rollers will be directly engaged therewith, as clearly illustrated in Figure 2. It will also be noted that the drive roller of each load-carrying roller is positioned substantially directly therebeneath, whereby the angular relation between the drive rollers and their respective load-carrying rollers will not effect the driving connection between said rollers. It is also to be noted that the axles of all of the pulleys and rollers engaged by each drive belt 14 are arranged substantially in parallel relation, whereby said belts will operate in a normal way, and will be relieved of abnormal strains such as may result from twisting of the belt when the upper run of the belt is guided to substantially follow the arc of the conveyer curve. The uppermost portions of the snub rollers 17 are preferably disposed on a level substantially above the level of the lower portions of the drive rollers 9, so that the upper runs of the belts 14 will be held in driving engagement with said drive rollers by said snub rollers, as clearly shown in Figure 2. The elongated apertures 12 provided in the side rails 13 of the drive sections permit a slight up-and-down movement of the drive rollers 9, whereby they may be held in driving contact with their respective load-carrying rollers by the snubbing action of the belts 14.

Figure 5:
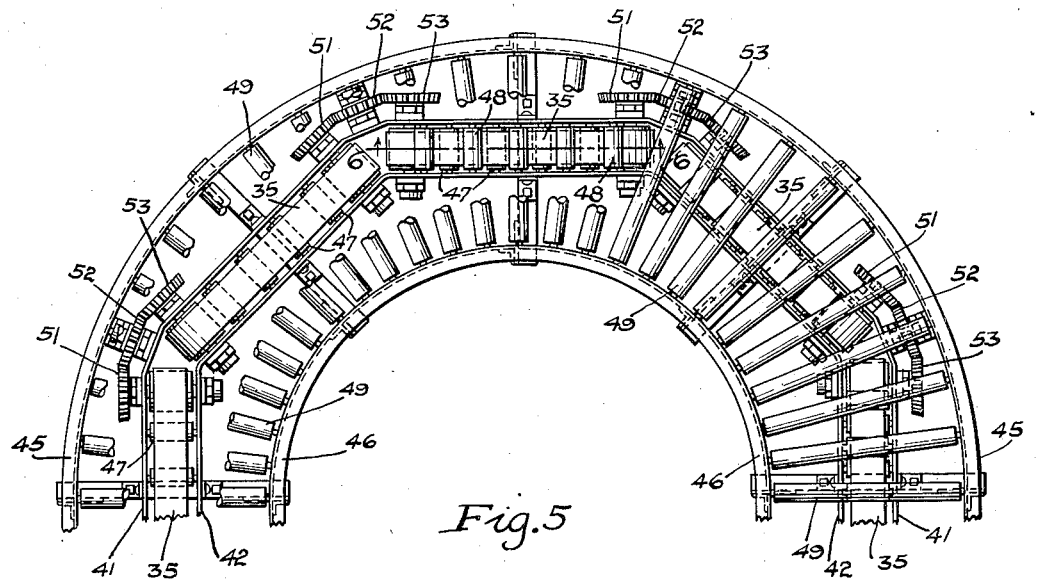
Figure 5 is a view showing another arrangement of the drive as applied to a 180 degree curve.
Figure 6:
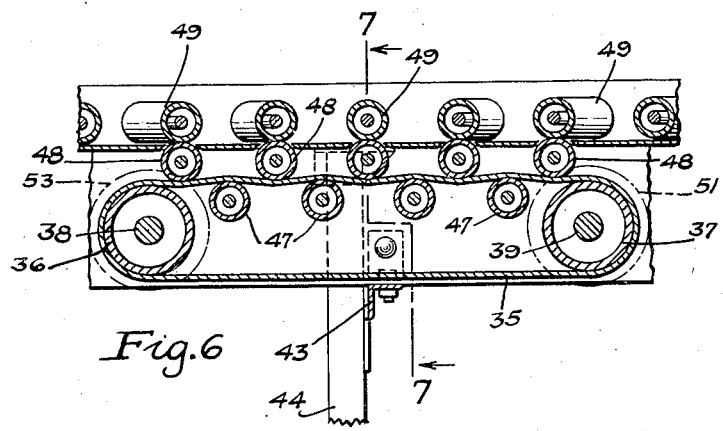
Figure 6 is an enlarged detail sectional view on the line 6—6 of Figure 5.
Figure 7:
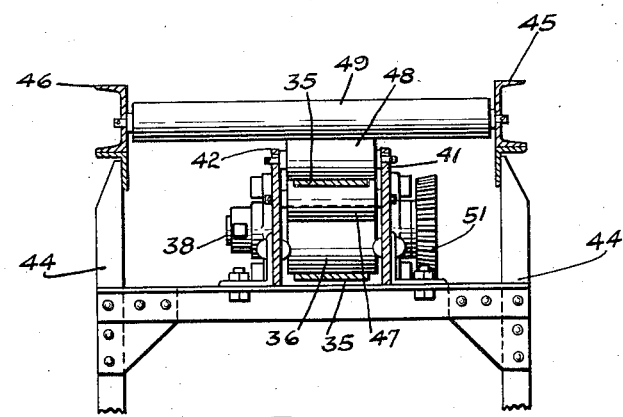
Figure 7 is a detail sectional view on the line 7—7 of Figure 6.

Figures 5, 6, and 7 illustrate another form wherein the drive consists of a plurality of relatively short, straight drive sections arranged end to end around the curve, as shown in Figure 5. As these sections are similar in construction, but one will be described in detail.

As shown in Figure 6, each section comprises a belt 35 mounted upon suitable pulleys 36 and 37 secured to shafts 38 and 39, respectively, supported in a pair of side rails 41 and 42. These side rails preferably extend the full length of the curve, as shown in Figure 5 and are supported upon suitable cross members 43 secured to the structural supporting frame 44, upon which the side rails 45 and 46 of the conveyer section are mounted.

A plurality of idler or snub pulleys 47 engage the lower face of the upper run of the belt 35 to hold it in driving engagement with the drive rollers 48 of the drive connection. The drive rollers 48, like the drive rollers 9 in Figure 2, are disposed substantially directly below their respective load-carrying rollers 49, and are held in driving engagement with the peripheries thereof by the snubbing action of the idler or snub rollers 47.

The series of drive sections shown in Figure 1 are operatively connected together for simultaneous operation by suitable gears 51, 52 and 53, the gears 51 and 53 being secured to the shafts 39 and 38 of adjacent sections, and the intermediate gear 52 being rotatably mounted upon a stud or shaft suitably supported in the frame of the structure. The gears 52 merely function as idlers to transmit power from one drive section to another. By thus operatively connecting together all of the sections for simultaneous operation, they may be driven from a single source of power, not shown, suitably connected to one of said sections.

In the form shown in Figure 5, all of the load-carrying rollers of the curve, with the exception of the rollers disposed directly above the idler gears 52 are power driven. These rollers, it will be noted, are not provided with drive rollers 48 and are therefore free to idle upon their axles. The spacing between the driven load-carrying rollers at the ends of each pair of drive sections is such, however, that the articles or commodities conveyed over the system may be conveyed over the load-carrying rollers without interruption.

The unique construction of the drive herein disclosed renders it desirable and efficient for use where a live roller section is incorporated into a belt conveyer as, for example, in a belt conveyer adapted to divert articles from the belt onto a branch conveyer leading therefrom. Some articles are almost impossible to slide from a conveyer belt, due to friction, roughness, etc., but they can readily be forced or diverted from a conveyer employing revolving rollers, without damage either to the articles or to the rollers. In the drive herein disclosed, the drive belts are snubbed so as to frictionally engage the bottoms of the drive rollers and move them into frictional engagement with the peripheries of their respective load-carrying rollers. The drive rollers are preferably equal in length to the width of the drive belts and will rotate the load-carrying rollers connected therewith in the same direction as the travel of the belt. The load-carrying rollers are preferably tubular, and may be constructed of steel, fibre, wood, or other suitable material, and in some instances, the peripheries thereof may be rubber coated.

For the transportation of very light articles, there may, in some cases, be economy in the use of a very narrow belt such as a V-type or a round belt. To further economize in the construction where light articles are to be conveyed, a single endless belt may be used in lieu of a plurality of drive belts, as shown in Figures 1 and 5. When such a single belt is employed, one run thereof may be guided around the entire length of the curve so as to engage the drive rollers engaged with the lower portions of the load-carrying rollers.

I claim as my invention:

1. In a live roller conveyer, a plurality of load-carrying rollers, a drive belt, and a series of drive elements operatively engaged with said belt and each having a driving connection with one of said load-carrying rollers whereby the latter will be rotated when said belt is operated, said drive elements being angularly disposed to their respective load-carrying rollers.

2. In a live roller conveyer, a plurality of driven load-carrying rollers, a drive belt, and a drive roller for each of said load-carrying rollers, said drive rollers being adapted to transmit power from the belt to said load-carrying rollers, and having substantially point contacts therewith.

3. In a live roller conveyer, a plurality of load-carrying rollers, a drive belt, and a drive roller disposed directly beneath each load-carrying roller and frictionally engaged therewith and each having a driving connection with said belt whereby said load-carrying rollers will be rotated when said belt is operated, said drive rollers being angularly disposed relatively to their respective load-carrying rollers.

4. In a live roller conveyer, a plurality of load-carrying rollers, a series of drive rollers peripherally engaged with said load-carrying rollers and angulaly disposed relatively to their respective load-carrying rollers, a drive belt, and means for snubbing said belt into driving engagement with said drive rollers to rotate the latter and thereby impart rotary motion to said load-carrying rollers.

5. In a live roller curve, a plurality of load-carrying rollers, a drive belt, a series of drive rollers for transmitting power from said belt to said load-carrying rollers to rotate the latter, said drive rollers being angularly disposed with respect to their load-carrying rollers.

6. In a live roller curve, a plurality of radially disposed load-carrying rollers, a drive belt, and a series of drive rollers having their peripheries frictionally engaged with said belt and with said load-carrying rollers whereby the latter will be rotated when the belt is operated, and the axes of said drive rollers being angularly disposed with respect to the axes of their respective load-carrying rollers.

7. In a live roller curve, a plurality of radially disposed load-carrying rollers, means for rotating said rollers comprising a series of driving sections mounted beneath said rollers and each comprising a drive belt, a plurality of drive rollers frictionally engaged with said load-carrying rollers and angularly disposed with respect thereto, and said drive rollers having driving connections with said belt whereby when the latter is operated, said load-carrying rollers will be actuated by said drive rollers.

8. In a live roller curve, a plurality of radially disposed load-carrying rollers, means for rotating said rollers comprising a series of drive sections mounted beneath said rollers and each comprising a substantially straight drive belt, a plurality of drive rollers interposed between each of said belts and their respective load-carrying rollers for transmitting power to the latter, said drive rollers being disposed at right angles to their respective belts, means for snubbing said belts into driving engagement with said drive rollers, and means operatively connecting together said drive belts for simultaneous operation.

9. In a live roller curve, a plurality of radially disposed load-carrying rollers, means for rotating said rollers comprising a series of drive sections mounted beneath said rollers and each including a substantially straight drive belt, a plurality of drive elements frictionally engaging said drive belts and peripherally engaging said load-carrying rollers, whereby when said belts are driven, said load carrying rollers will be rotated.

10. In a live roller curve, a plurality of driven radially disposed load-carrying rollers, a plurality of straight drive sections mounted beneath said rollers and each comprising a drive belt, and drive rollers for transmitting power from said belts to said driven load-carrying rollers disposed at right angles to their respective belts, and whereby said rollers are angularly disposed to their respective load-carrying rollers.

11. In a live roller curve, a plurality of driven radially disposed load-carrying rollers, a plurality of straight drive sections arranged end to end beneath said rollers and each comprising a drive belt, drive rollers for transmitting power from said belts to said driven load-carrying rollers, a plurality of snub rollers for holding the belt in frictional engagement with said drive rollers, said snub rollers being disposed in parallel relation to said drive rollers and means for simultaneously operating all of said belts.

12. In a live roller curve, a plurality of radially disposed load-carrying rollers, a series of drive elements peripherally engaging said rollers, a drive for said elements comprising an endless drive belt having one run frictionally engaging said elements and having its runs operating in substantially a vertical plane, and means for operating said belt whereby said load carrying rollers are rotated.

13. In a live roller curve, a plurality of radially disposed load-carrying rollers, a series of drive elements peripherally engaging said rollers, a drive for said elements comprising a plurality of endless drive belts arranged in angular relation around the curve and having their upper runs frictionally engaging said drive elements, and the runs of each of said drive belts operating in substantially a vertical plane, and means for simultaneously operating said belts whereby said load-carrying rollers are rotated.

14. In a live roller curve, a plurality of driven radially disposed load-carrying rollers, and a drive roller for each driven load-carrying roller, said drive rollers being angularly disposed with respect to their respective driven load-carrying rollers, and means for driving said drive rollers.

15. In a live roller curve, a plurality of driven radially disposed load-carrying rollers, and a drive roller for each driven load-carrying roller, said drive rollers being arranged in spaced parallel relation relatively to each other whereby they are angularly disposed with respect to their respective driven load-carrying rollers, and means for driving said drive rollers.

16. In a live roller conveyer, a plurality of load-carrying rollers, a drive belt, and a series of drive elements interposed between said load-carrying rollers and said drive belt and having driving connections therewith, whereby when said belt is driven, said rollers will be rotated, and certain of said drive elements being angularly disposed with respect to said load carrying rollers.

17. In a live roller conveyer, a plurality of driven radially disposed load-carrying rollers, a drive belt, and a series of drive elements having frictional driving connections with said driven load-carrying rollers and said drive belt, whereby said rollers will be rotated when the belt is driven.

MARTIN J. ANDERSON.